June 24, 1930.  E. E. McCLURE  1,766,663
LUBRICATING MECHANISM FOR EDGER SAWS
Filed July 28, 1928  2 Sheets-Sheet 2
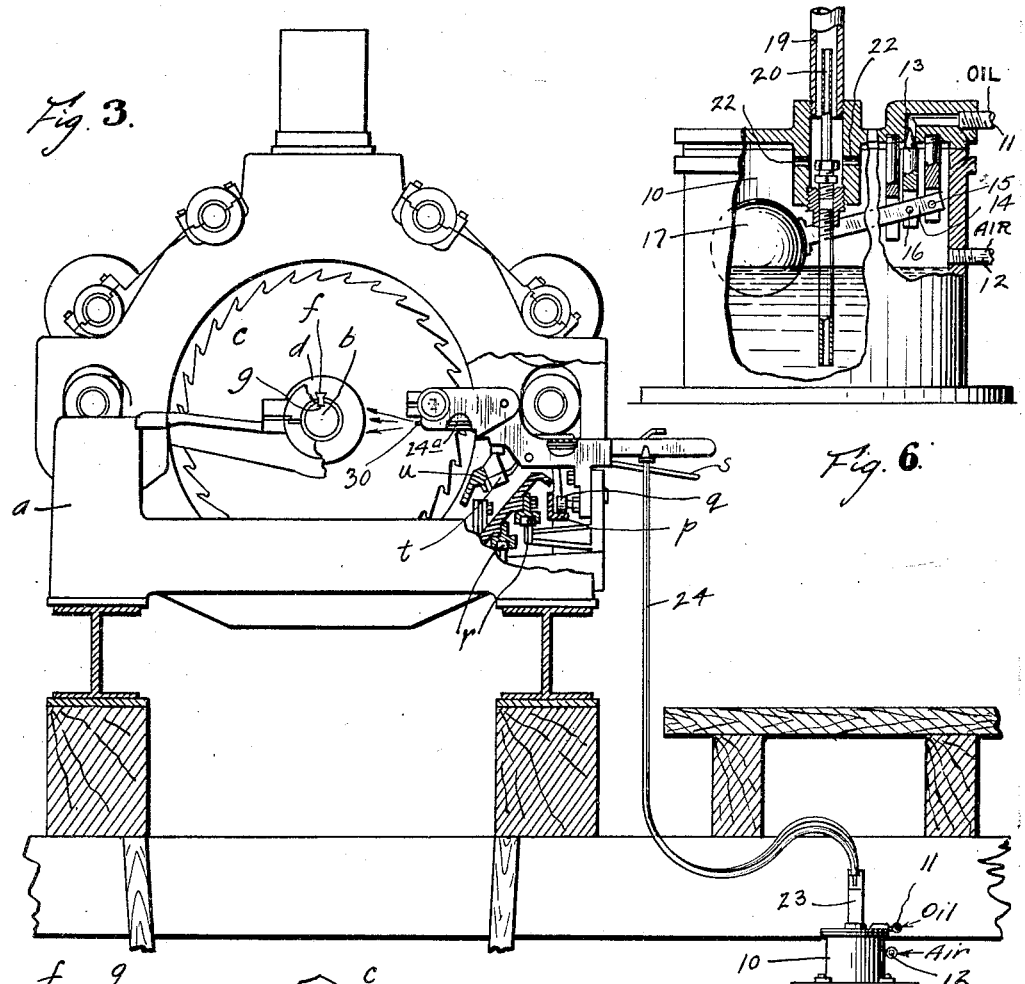
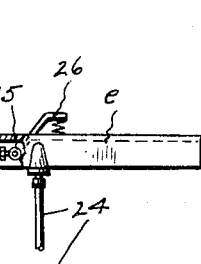
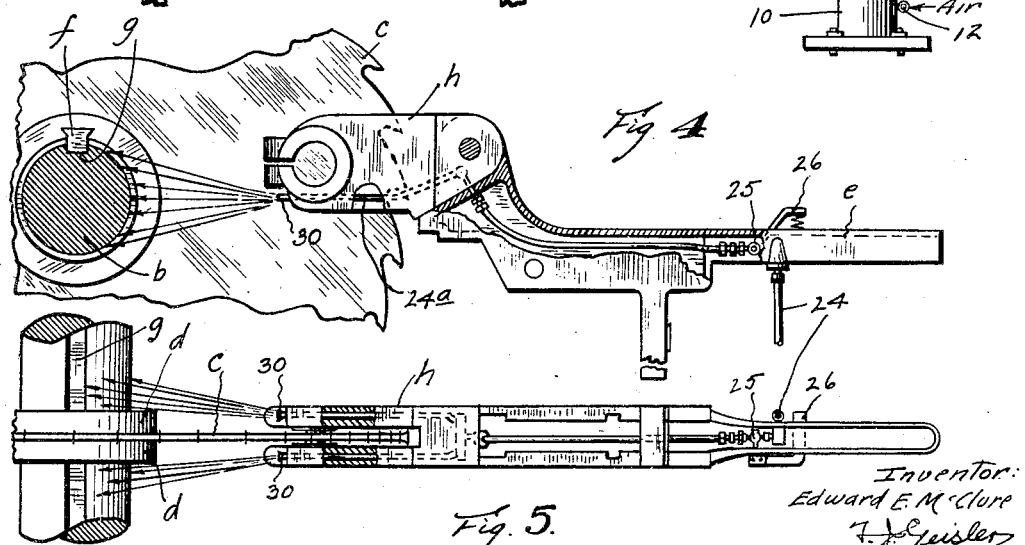
Inventor:
Edward E. McClure Patented June 24, 1930

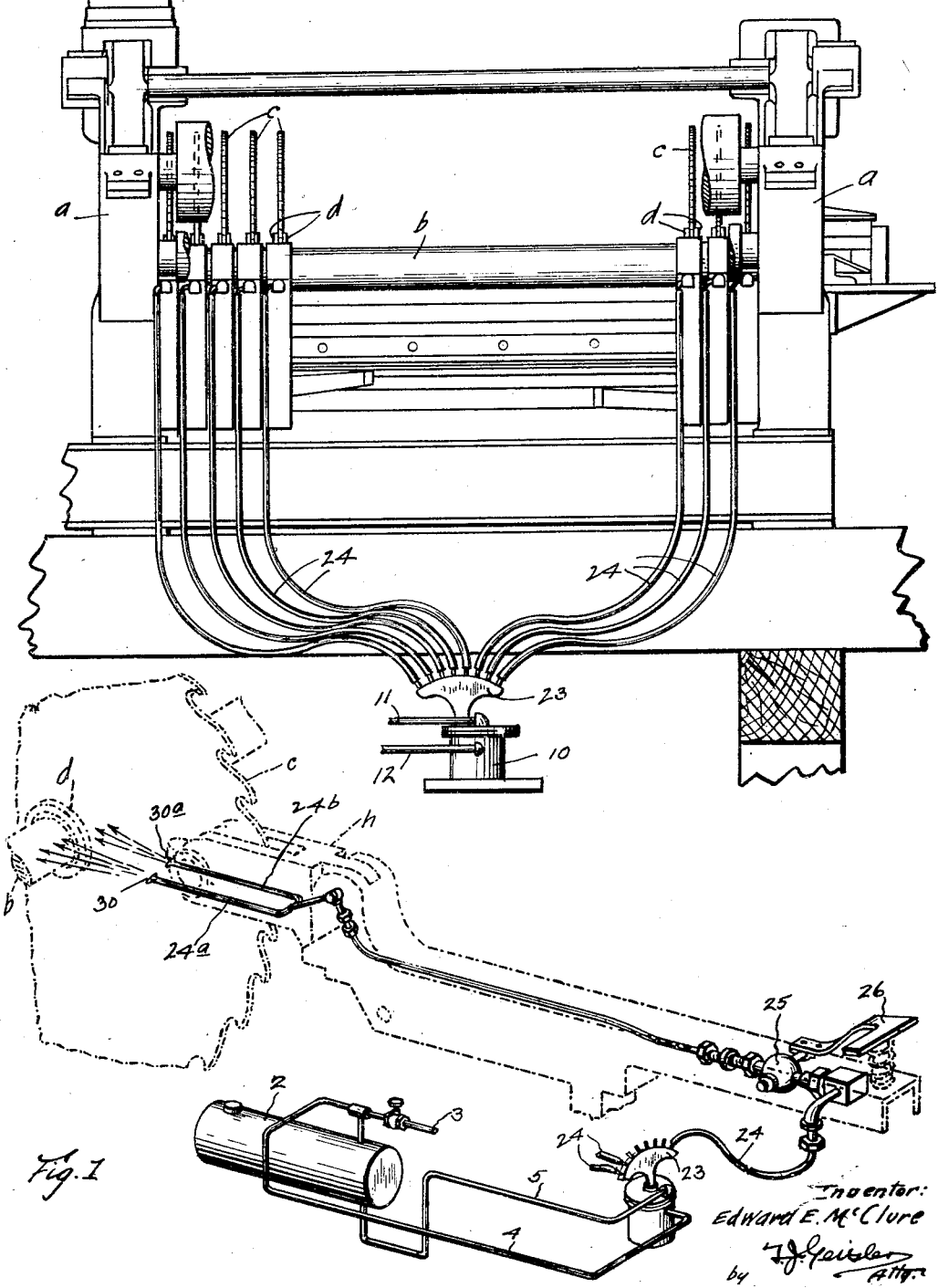

1,766,663

UNITED STATES PATENT OFFICE

EDWARD E. McCLURE, OF PORTLAND, OREGON

LUBRICATING MECHANISM FOR EDGER SAWS

Application filed July 23, 1928. Serial No. 295,888.

My invention relates to lubricating means for devices comprising a shaft or arbor, and an operating member slidably mounted thereon, as, for example, in edger saws and the like.

Edger saws, as well known, comprise a number of spaced parallel saws mounted on a common driven shaft or arbor for longitudinal movement on the latter; the same being shifted to desired relative positions by shifter mechanism operated by an attendant, thereby to space the saws for edging the pieces of lumber to the desired width.

The mode heretofore commonly employed for lubricating the arbor of edger saws consisted in the application of lubricant to the arbor by an attendant; but such is unsatisfactory, for negligence on the part of the attendant may cause the saws to stick thus damaging the saw or the shifter mechanism, or both; or, when done mechanically and continuously, the application of lubricant tends to become excessive, wasting the lubricant. Furthermore, if the arbor is heavy and continuously lubricated along its entire length, regardless of whether the saws are being shifted or not, saw dust tends to collect on the arbor clogging the splines, and creating resistance to the shifting of the saws; even causing them to stick.

Furthermore, when the saw is shifted, the collars thereof tend to wipe the lubricant from the arbor, so that the saw when moved in the reverse direction is moved over a substantially dry arbor. To prevent such condition, the latter should be lubricated in advance of the movement of the saw.

Furthermore, since the saws are driven at a high rate of speed, the splines of the saw collars describe substantially a spiral, and in consequence the saws tend to stick on the arbor, more or less, unless the latter is kept properly lubricated.

The object of my invention is, therefore, to provide simple, efficient, and economical means for lubricating the arbor of saw edgers, and the like.

I attain my object by providing, in combination with the arbor, the saws carried thereby, and the shifter mechanism thereof, means, in part carried by said shifter mechanism, functioning to impinge on the arbor, preferably on each side of the saws, and adjacent the latter, respectively,—thus economically applying the lubricant only to that portion of the arbor over which the saw is being shifted—a blast of air charged with lubricant, preferably in atomized form; thereby first to remove the saw dust deposited upon the arbor, and then to spray the arbor with a film of lubricant; said lubricating means being arranged for control by the attendant of the said shifter mechanism.

These and other incidental objects and the details of construction and mode of operation of my invention are hereinafter fully described with reference to the accompanying drawings.

In the drawings:

Fig. 1 shows diagrammatically my lubricating means and its relative arrangement to the shifter;

Fig. 2 shows diagrammatically a rear view of an edger saw machine and illustrates the relative arrangement of my lubricating means;

Fig. 3 shows an end view of an edger saw machine and illustrates the details of construction and arrangement of the lubricating means;

Fig. 4 shows in an enlarged fragmentary side elevation, the shifter mechanism and the control for my lubricating means;

Fig. 5 shows similarly a bottom view of the same; and

Fig. 6 shows an enlarged view of the regulating and atomizing device, with a portion broken away to disclose the details of construction.

Referring to the drawings:

The edger saw machine comprises a frame $a$ carrying a shaft or arbor $b$ on which a series of saws $c$ are mounted in collars $d$, which are keyed to the arbor, as at $f$, but adapted to be moved longitudinally on the shaft in a common keyway $g$.

A horizontal angle iron $p$ is carried by the frame $a$, parallel with, but spaced from the arbor $b$ sufficiently to provide clearance for the saws, on which are carried the shifters mounted for longitudinal movement on rollers q. Other rollers r are carried by the said shifters for holding them against lateral displacement.

Each shifter comprises a forked member h, between the ends of which a blade c is arranged, and is formed with a shank or handle e extending outwardly from the frame, on which is carried an operating lever s, adapted to release a pawl t from engagement with a rack bar u, by which the shifter is held securely in place at any desired adjustment, that is spacing from the adjacent saw.

The foregoing is the description of a conventional edger saw machine.

My invention comprises a lubricant storage tank 2, connected by a pipe line 3, to a source of fluid pressure, preferably compressed air. A pipe line 4 is connected with the line 3 and to an atomizing and regulating device, which is also connected by a line 5 with the storage tank 2.

The atomizing and regulating device comprises a chamber 10, provided with a lubricant inlet 11 to which the pipe line 5 is connected, and an air inlet 12, to which the line 4 is connected. The lubricant inlet 11, is controlled by a needle valve 13, operated by lever 14, pivoted as at 15 and pivotally connected to the needle valve as at 16. The other end of the lever 14 is provided with a float 17 and is adjusted to prevent the lubricant from rising above the level of the air inlet 12. The chamber 10 is also provided with a tubular outlet 19 in which an atomizing tube 20 is inserted extending almost to the bottom of the tank and below the level of the lubricant. The outlet 19 is of greater diameter than the tube 20, which is threaded into the lower portion, but extends upwardly into the outlet. Orifices 22 are provided in the upper portion of the tubular outlet opening from the top of said chamber.

The outlet 19 is connected with a branching conduit 23. The branching conduit 23 is connected to a number of flexible conduits 24 leading to each shifter, in which are provided control valves 25, carried by the handle e of the shifter, operated by a spring-controlled lever 26, adapted to normally hold the valve closed, and which are conveniently arranged to be depressed to open the valve, by the attendant as the shifter is operated.

Each conduit 24 passes along the shifter and branches as at 24$^a$, 24$^b$ to follow each side of the forked member h, where they terminate, and are provided with nozzles 30, 30$^a$, adapted to discharge on the arbor of the saw at each side of its collar d.

In operation, compressed air forces the lubricant from the tank 2, into the chamber 10, through the inlet 11, and compressed air is supplied to the chamber through the inlet 12, under equal pressure to the pressure in the tank 2, through the pipe line 4, which bypasses the pressure line 3, so that a balance of pressure between the lubricant and air in the chamber is always maintained.

The float 17 controls the needle valve 13 to prevent the tank from filling with lubricant above the air inlet and flooding the air pressure line 4.

When the attendant adjusts a saw c for edging lumber to the desired width, he grasps the handle e to shift the saw and at the same time presses the lever 26, which opens the control valve 25.

The opening of the valve 25 permits the air pressure to escape through the orifices 22 in the tubular outlet 19, which rushes upward past the upper end of the atomizing tube 20, creating a vacuum in the tube and drawing the lubricant upwardly until it reaches the top, where it is atomized by the out-rushing air and is carried through the conduit 24 and sprayed upon the saw arbor at each side of the saw, as long as the attendant holds the lever 26 depressed, and no longer.

In effect, when the valve 25 is first opened, the air already in the conduits is first displaced, so that air charged with finely atomized lubricant does not reach the arbor until the accumulated sawdust has been blown away by the first blast of air.

Thus the arbor is first cleaned of sawdust, and then only when needed, that is, when a saw is being shifted.

I claim:

1. The combination with an arbor and an operating device slidably mounted thereon, of shifting means, for the said device, provided with a lubricating conduit adapted to discharge against the arbor, means for delivering air under pressure charged with lubricant to said conduit, and the latter means including a manually operated control valve.

2. The combination with an arbor and an operating device slidably mounted thereon, of shifting means, for the said device, provided with a lubricating conduit adapted to discharge against the arbor, means for delivering atomized lubricant under air pressure to said conduit, and the latter means including a manually operated control valve.

3. The combination with an arbor and an operating device slidably mounted thereon, of shifting means, for the said device, provided with a lubricating conduit terminating in spraying means adapted to discharge against the arbor, means for delivering air under pressure charged with lubricant to said conduit, and the latter means including a manually operated control valve.

4. The combination with an arbor and an operating device slidably mounted thereon, of shifting means, for the said device, provided with a lubricating conduit terminating in spraying means, adapted to discharge against the arbor on each side of said device, means for delivering air under pressure charged with lubricant to said conduit, and the latter means including a manually operated control valve.

5. The combination with an arbor and an operating device slidably mounted thereon, of shifting means, for the said device, provided with a lubricating conduit adapted to discharge against the arbor, means for delivering air under pressure charged with lubricant to said conduit, and the latter means including a manually operated control valve carried by said shifter means.

6. The combination with an arbor, an operating device slidably mounted thereon, and shifter mechanism for the device, of means for impinging upon said arbor, adjacent air charged with lubricant, said means including a manual control located for operation simultaneously with the said shifter mechanism.

7. The combination with an arbor, an operating device slidably mounted thereon, and shifter mechanism for the device, of means for impinging upon said arbor adjacent and at each side of the operating device, air charged with lubricant, said means including a manual control located for operation simultaneously with the said shifter mechanism.

8. The combination with an arbor, an operating device slidably mounted thereon, and shifter mechanism for the device, of means for impinging upon said arbor, adjacent and at each side of the operating device, air charged with atomized lubricant, said means including a manual control located for operation simultaneously with the said shifter mechanism.

9. In an edger saw, the combination with the arbor, the edger saws slidably mounted thereon, and the shifter mechanism, of lubricating means for said arbor comprising a tank for holding lubricant, a chamber, means for feeding lubricant from said tank into said chamber, means for delivering air under pressure to said tank and to said chamber, a tubular outlet from the chamber, air ports opening from said chamber into said outlet, an atomizer tube located in said outlet and extending downward into the lubricant contained in said chamber, a valve controlling the admission of lubricant into said chamber, said shifter mechanism provided with a conduit terminating in means for spraying said arbor at each side of the saw, and a manually operated valve controlling said conduit, said valve carried by said shifter mechanism.

10. In an edger saw, the combination with the arbor, the edger saws slidably mounted thereon, and the shifter mechanism, of lubricating means for said arbor comprising a tank for holding lubricant, a chamber, means for feeding lubricant from said tank into said chamber, means for delivering air under pressure to said tank, and by-passing part of said air and delivering the same to said chamber, a tubular outlet from the chamber, air ports opening from said chamber into said outlet, an atomizer tube located in said outlet and extending downward into the lubricant contained in said chamber, a valve controlling the admission of lubricant into said chamber, said shifter mechanism provided with a conduit terminating in means for spraying said arbor at each side of the saw, and a manually operated valve controlling said conduit, said valve carried by said shifter mechanism.

11. In an edger saw, the combination with the arbor, the edger saws slidably mounted thereon, and the shifter mechanism, of lubricating means for said arbor comprising a tank for holding lubricant, a chamber, means for feeding lubricant from said tank into said chamber, means for delivering air under pressure to said tank and to said chamber, a tubular outlet from the chamber, air ports opening from said chamber into said outlet, an atomizer tube located in said outlet and extending downward into the lubricant contained in said chamber, a valve controlling the admission of lubricant into said chamber, and a float in the latter controlling said valve, said shifter mechanism provided with a conduit terminating in means for spraying said arbor at each side of the saw, and a manually operated valve controlling said conduit, said valve carried by said shifter mechanism.

12. In an edger saw, the combination with the arbor, the edger saws slidably mounted thereon, and the shifter mechanism, of lubricating means for said arbor comprising a tank for holding lubricant, a chamber, means for feeding lubricant from said tank into said chamber, means for delivering air under pressure to said tank, and by-passing part of said air and delivering the same to said chamber, a tubular outlet from the chamber, air ports opening from said chamber into said outlet, an atomizer tube located in said outlet and extending downward into the lubricant contained in said chamber, a valve controlling the admission of lubricant into said chamber and a float in the latter controlling said valve, said shifter mechanism provided with a conduit terminating in a spray nozzle, and a manually operated valve controlling said conduit, said valve carried by said shifter mechanism.

EDWARD E. McCLURE.